United States Patent [19]

Matuda et al.

[11] 4,376,105

[45] Mar. 8, 1983

[54] PROCESS FOR PRODUCING NITROUS OXIDE

[75] Inventors: Hiroshi Matuda; Takamoto Nishimura; Yoshiyuki Tanaka; Yoshihiko Hatabu, all of Ube, Japan

[73] Assignee: Ube Industries, Ltd., Yamaguchi, Japan

[21] Appl. No.: 299,221

[22] Filed: Sep. 3, 1981

[30] Foreign Application Priority Data

Sep. 9, 1980 [JP] Japan ............................. 55-124075

[51] Int. Cl.³ ............................................ C01B 21/22
[52] U.S. Cl. ................................... 423/400; 423/531
[58] Field of Search ..................... 423/400, 523, 531; 210/757, 903

[56] References Cited

U.S. PATENT DOCUMENTS

| 2,198,686 | 4/1940 | Watson | 423/523 |
| 3,565,575 | 2/1971 | Warshaw | 423/235 |
| 4,203,959 | 5/1980 | Münster | 423/400 |

FOREIGN PATENT DOCUMENTS

| 2831941 | 2/1980 | Fed. Rep. of Germany | 423/531 |
| 45-13446 | 5/1970 | Japan | 423/400 |

*Primary Examiner*—G. Peters
*Attorney, Agent, or Firm*—Burgess, Ryan and Wayne

[57] ABSTRACT

Nitrous oxide having a high purity is produced by reacting urea, nitric acid and sulfuric acid at a temperature of 40° through 100° C., and isolating the resultant nitrous oxide from the reaction gas mixture, without any danger of, for example, explosion during the reaction and without using expensive catalysts and sulfamic acid.

11 Claims, No Drawings

PROCESS FOR PRODUCING NITROUS OXIDE

The present invention relates to a process for producing nitrous oxide and, more specifically, it relates to a process for producing nitrous oxide from urea, nitric acid and sulfuric acid.

The nitrous oxide ($N_2O$) is widely utilized, as an anesthesia agent, directly or after mixing with oxygen.

Various processes for producing nitrous oxide have been heretofore known in the art. Typical examples for producing nitrous oxide are, (1) a process in which ammonium nitrate is subjected to pyrolysis; (2) a process in which ammonia is oxidized in a gas phase in the presence of a catalyst; (3) a process in which sulfamic acid and nitric acid are reacted with each other; and the like. However, there are various disadvantages in these processes. For instance, in the above-mentioned process (1), the reaction is likely to get out of control and, therefore, there is a danger of an explosion. There are disadvantages in the above-mentioned process (2) that not only is the use of expensive noble metal catalysts required, but also the isolation and purification step are troublesome. Furthermore, in the above-mentioned process (3), the unreacted sulfamic acid remains in sulfuric acid (waste liquid). Accordingly, for instance, in the case where the waste liquid is recovered and, then, ammonium sulfate, compound fertilizer and the like are manufactured, the sulfamic acid, which is harmful to the fertilizer, should be removed from the waste liquid. In addition, the cost of the sulfamic acid, which is used as a starting material in this process, is higher than the costs of the starting materials used in the other processes.

Accordingly, an object of the present invention is to obviate the above-mentioned disadvantages of the known processes for producing nitrous oxide and to provide a process for producing the same in which (i) there is no danger of explosion during the reaction, (ii) the use of expensive catalysts and starting materials and the like is not necessary and (iii) nitrous oxide having a high purity can be readily isolated and obtained from the reaction mixture.

Other objects and advantages of the present invention will be apparent from the following description.

In accordance with the present invention, there is provided a process for producing nitrous oxide comprising the steps of:
reacting urea, nitric acid and sulfuric acid at a temperature of 40° through 100° C., and
isolating the resultant nitrous oxide from the reaction gas mixture.

In the practice of the present invention, urea, nitric acid and sulfuric acid can be added in any order to a reaction vessel. However, it is desirable that urea is added to sulfuric acid and, preferably, after the urea is dissolved in the sulfuric acid, and nitric acid is then added to the mixture, whereby the reaction is effected. This is because the control of the reaction temperature is easy and the desired reaction smoothly proceeds and nitrogen monoxide, nitrogen dioxide and the like are not generated and, further, the separation and purification of the resultant nitrous oxide are easy. However, it should be noted that the reaction can be carried out by the addition of urea to nitric acid, followed by the addition of sulfuric acid thereto, or the addition of nitric acid to sulfuric acid, followed by the addition of urea thereto. However, in these addition methods, nitrogen oxides such as nitrogen monoxide, nitrogen dioxide and the like are likely to be formed and the isolation and purification of the resultant nitrous oxide from the reaction gas mixture are likely to be troublesome.

The reaction of urea, nitric acid and sulfuric acid according to the present invention proceeds as follows.

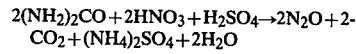

In the practice of the present invention, the nitric acid can be desirably used at the concentration of 50 through 98% by weight, more preferably, 60 through 90% by weight. In the case where the concentration of the nitric acid is too low, the rate of the reaction becomes slow and the use of the sulfuric acid having a high concentration is required. In this case, if the reaction temperature is raised to increase the rate of the reaction, undesirable nitrogen oxides such a nitrogen monoxide and nitrogen dioxide are generated. Contrary to this, in the case where the concentration of the nitric acid is too high, undesirable nitrogen oxides such as nitrogen monoxide and nitrogen dioxide are likely to be generated and, also, nitric acid vapor and the above-mentioned nitrogen oxides are likely to accompany the desired resultant gas. For these reasons, the use of nitric acid having the above-mentioned concentration range is desirable. The nitric acid can be used generally in an amount of 1.5 mol or less, preferably 0.5 through 1.3 mol, based on 1 mol of the urea.

When the concentration of the sulfuric acid used in the present invention is too low, a smooth reaction cannot be effected. Thus, concentrated sulfuric acid having a concentration of 70% by weight or more, preferably 90% by weight or more can be suitably used in the present invention. Although the amount of sulfuric acid to be used in the present invention depends upon the concentration of the sulfuric acid, the concentration and the amount of the nitric acid used, the sulfuric acid is generally used in an amount of 1 mol or more, preferably 2 through 4 mol, based on 1 mol of the urea.

In the practice of the present invention, the urea can be used in the form of a solid such as particles, powder and the like, or in the form of an aqueous solution.

The reaction of the urea, nitric acid and sulfuric acid according to the present invention can be carried out at a temperature of 40° through 100° C., preferably 65 through 90° C. In the case where the reaction temperature is too low, the desirable reaction does not proceed. Contrary to this, if the reaction temperature is too high, the nitrogen oxides such as nitrogen monoxide and nitrogen dioxide and nitric acid vapor are accompanied with the resultant reaction gas, which necessitates a troublesome isolation and purification operation of the desired nitrous oxide. For these reasons, the reaction should be carried out in the above-mentioned temperature range. Although the reaction time depends upon the reaction conditions such as the reaction temperature, the concentration and amount of nitric acid used, the concentration and the use amount of sulfuric acid used and the like, the reaction time is generally between 0.5 and 10 hours. The reaction of the present invention is conveniently carried out under normal pressure (i.e. atmospheric pressure).

In the case where urea, nitric acid and sulfuric acid are reacted at a temperature of 40° through 100° C. according to the present invention, the resultant reaction gas mixture containing nitrous oxide and carbon dioxide and diluted sulfuric acid containing ammonium sulfate and minor or trace amounts of the unreacted nitric acid and urea are obtained. The resultant reaction gas mixture substantially comprises nitrous oxide and carbon dioxide and, from this gas mixture, the desired nitrous oxide is isolated and obtained. The isolation of the nitrous oxide from the reaction gas mixture can be carried out by a conventional so-called carbon dioxide removal method. For instance, the resultant reaction gas mixture is washed with an aqueous alkaline solution such as sodium hydroxide, potassium hydroxide and the like, whereby the carbon dioxide contained in the reaction gas mixture is absorbed with the aqueous alkaline solution and removed from the gas mixture. Thus, the desired nitrous oxide having a high purity can be readily isolated from the resultant reaction gas mixture.

As mentioned hereinabove, according to the present invention, the desired nitrous oxide having a high purity can be advantageously produced without any danger of, for example, an explosion during the reaction and also without the use of expensive catalysts and the expensive starting sulfamic acid. Furthermore, since the resultant reaction gas mixture obtained from the present reaction consists substantially of nitrous oxide and carbon dioxide, the desired nitrous oxide having a high purity can be isolated from the resultant reaction gas mixture by, for example, only washing the resultant reaction gas mixture with an aqueous alkaline solution. In addition, the recovered diluted sulfuric acid containing ammonium sulfate does not include impurities such as sulfamic acid, which are harmful to fertilizers, and only includes a minor amount of the unreacted nitric acid and urea, the sulfuric acid recovered from the resultant reaction mixture can be utilized in various ways.

The reaction of the present invention can be batchwise or continuously carried out by using any known reaction apparatus.

The present invention now will be further illustrated by, but by no means limited to, the following Examples and a Comparative Example wherein all percentages are expressed on a weight basis unless otherwise specified.

EXAMPLE 1

3 mol of 98% sulfuric acid was charged in to a 300 ml flask and, then, 1 mol of powdered urea was added to the sulfuric acid under stirring. After the urea was dissolved in the sulfuric acid, 1 mol of 68% nitric acid was gradually dropped into the solution. The reaction was carried out for 5 hours at a reaction temperature of 70° C. The formed reaction gas generated from the flash was washed with a 10% aqueous sodium hydroxide solution and 21.3 liters of nitrous oxide gas (containing 99.9% by volume of $N_2O$) was obtained. Nitrogen oxides such as nitrogen monoxide and nitrogen dioxide were not observed in the generated gas mixture. In addition, a minor amount of the unreacted nitric acid and urea was observed in the resultant reaction mixture, but no sulfamic acid was observed.

EXAMPLE 2

The reaction was carried out in a manner as described in Example 1, except that the reaction temperature was changed to a temperature of 60° C.

15.2 liters of nitrous oxide gas (containing 99.9% by volume of $N_2O$) were obtained. As in the case of Example 1, nitrogen oxides such as nitrogen monoxide and nitrogen dioxide were not observed in the generated reaction gas. In addition, no sulfamic acid was observed in the resultant reaction liquid mixture.

EXAMPLES 3 and 4

The reactions were carried out in a manner as described in Example 2, except that 60% nitric acid (Example 3) and 90% nitric acid (Example 4) were used, in lieu of 68% nitric acid.

15.8 liters of nitrous oxide gas (Example 3) and 15.5 liters of nitrous oxide gas (Example 4) were obtained. The concentration of nitrous oxide ($N_2O$) in the resultant nitrous oxide gas was 99.9% by volume in each Example. Furthermore, in each Example, nitrogen oxides such as nitrogen monoxide and nitrogen dioxide were not observed in the generated reaction gas, as in Example 1. In addition, no sulfamic acid was observed in the resultant reaction liquid mixture in each Example.

COMPARATIVE EXAMPLE 1

The production of nitrous oxide was carried out in a manner as described in Example 1, except that the reaction temperature was changed to 30° C. However, the reaction did not proceed and no nitrous oxide gas was obtained.

We claim:

1. A process for producing nitrous oxide substantially devoid of nitrogen monoxide and nitrogen dioxide comprising
    (a) dissolving urea in sulphuric acid having a concentration of at least 98% by weight;
    (b) adding nitric acid to the resulting solution; and
    (c) heating said solution to a temperature of between 40° C. and 100° C. to produce a nitric oxide containing mixture 2. The process of claim 1 further comprising isolating nitrous oxide from said mixture by washing said mixture with an aqueous alkaline solution.

3. A process as claimed in claim 1, wherein the concentration of the nitric acid is 50 through 98% by weight.

4. A process as claimed in claim 1, wherein the nitric acid is used in an amount of 1.5 mol or less, based on 1 mol of the urea.

5. A process as claimed in claim 4, wherein the amount of the nitric acid is 0.5 through 1.3 mol, based on 1 mol of the urea.

6. A process as claimed in claim 1, wherein the sulfuric acid is used in an amount of 1 mol or more, based on 1 mol of the urea.

7. A process as claimed in claim 6, wherein the amount of the sulfuric acid is 2 through 4 mol, based on 1 mol of the urea.

8. A process as claimed in claim 1, wherein the reaction is carried out at a temperature of 65° through 90° C.

9. A process as claimed in claim 2, wherein the alkaline solution is an aqueous solution of sodium hydroxide, potassium hydroxide or a mixture thereof.

10. The process of claim 3 wherein the concentration of nitric acid is 60 to 90% by weight.

11. A process for producing nitrous oxide comprising the steps of:
    (a) dissolving urea in sulfuric acid having a concentration of at least 90% by weight;
    (b) adding nitric acid to the resulting solution;
    (c) heating said solution to a temperature of between 40° C. and 100° C. to produce a nitrous oxide containing reaction gas mixture; and
    (d) isolating nitrous oxide from the reaction gas mixture by washing the reaction gas mixture with an aqueous alkaline solution.

* * * * *

UNITED STATES PATENT AND TRADEMARK OFFICE
CERTIFICATE OF CORRECTION

PATENT NO. : 4,376,105

DATED : March 8, 1983

INVENTOR(S) : Hiroshi Matuda, et al

It is certified that error appears in the above-identified patent and that said Letters Patent is hereby corrected as shown below:

Column 3, line 51: "flash" should read --flask--

Signed and Sealed this

Twentieth Day of September 1983

[SEAL]

Attest:

GERALD J. MOSSINGHOFF

Attesting Officer    Commissioner of Patents and Trademarks